(12) United States Patent
Kontturi

(10) Patent No.: US 9,641,982 B2
(45) Date of Patent: May 2, 2017

(54) ELECTRONIC LOCATION INFORMATION TO MOBILE DEVICE

(71) Applicant: BT-WAY OY, Rajamäki (FI)

(72) Inventor: Anne Kontturi, Rajamäki (FI)

(73) Assignee: BT-WAY OY, Rajamaki (FI)

( * ) Notice: Subject to any disclaimer, the term of this patent is extended or adjusted under 35 U.S.C. 154(b) by 0 days.

(21) Appl. No.: 14/654,425

(22) PCT Filed: Nov. 28, 2013

(86) PCT No.: PCT/FI2013/051119
§ 371 (c)(1),
(2) Date: Jun. 19, 2015

(87) PCT Pub. No.: WO2014/096521
PCT Pub. Date: Jun. 26, 2014

(65) Prior Publication Data
US 2015/0350838 A1    Dec. 3, 2015

(30) Foreign Application Priority Data

Dec. 20, 2012   (FI) ..................................... 20120418

(51) Int. Cl.
*H04W 4/02*    (2009.01)
*G01S 1/68*    (2006.01)
(Continued)

(52) U.S. Cl.
CPC .............. *H04W 4/025* (2013.01); *G01S 1/02* (2013.01); *G01S 1/68* (2013.01); *G01S 5/0236* (2013.01);
(Continued)

(58) Field of Classification Search
CPC ..... H04W 4/025; H04W 4/008; H04W 88/06; H04W 64/00; H04W 4/02; G01S 1/02;
(Continued)

(56) References Cited

U.S. PATENT DOCUMENTS

| | | | |
|---|---|---|---|
| 2008/0176583 A1 | 7/2008 | Brachet et al. | |
| 2009/0106042 A1* | 4/2009 | Maytal | G06Q 30/018 705/317 |

(Continued)

FOREIGN PATENT DOCUMENTS

| | | |
|---|---|---|
| EP | 1 164 804 B1 | 8/2004 |
| FI | 115369 B | 4/2005 |

(Continued)

*Primary Examiner* — Brandon Miller
(74) *Attorney, Agent, or Firm* — Birch, Stewart, Kolasch & Birch, LLP

(57) ABSTRACT

The present invention describes a method and system how to get the location information to a mobile device indoors or outdoors. The method and system includes that one or several nodes capable to communicate with short-distance communication network having two or more pieces of location information in their identification are placed into the area where the mobile device capable to communicate with short distance communication network should get the location information. Method and system also includes in the mobile device an application which is able to detect, analyze and deduce the location based on the pieces of location information got from the node or nodes.

19 Claims, 2 Drawing Sheets

(51) Int. Cl.
*G01S 5/02* (2010.01)
*H04W 4/00* (2009.01)
*H04W 64/00* (2009.01)
*H04W 88/06* (2009.01)
*H04M 1/725* (2006.01)
*G01S 1/02* (2010.01)

(52) U.S. Cl.
CPC ........... *H04W 4/008* (2013.01); *H04W 64/00* (2013.01); *H04W 88/06* (2013.01); *H04M 1/7253* (2013.01); *H04M 2250/02* (2013.01); *H04W 4/02* (2013.01)

(58) Field of Classification Search
CPC ............ G01S 5/0268; H04M 2250/02; H04M 1/7253
See application file for complete search history.

(56) References Cited

U.S. PATENT DOCUMENTS

| | | |
|---|---|---|
| 2011/0200023 A1 | 8/2011 | Murray et al. |
| 2012/0115512 A1 | 5/2012 | Grainger et al. |
| 2012/0136623 A1 | 5/2012 | Edge et al. |

FOREIGN PATENT DOCUMENTS

| | | | | |
|---|---|---|---|---|
| WO | WO 2005/106523 A1 | 11/2005 | | |
| WO | WO 2009/072735 A1 | 6/2009 | | |
| WO | WO 2012/160560 A1 * | 11/2012 | ............... | G01S 3/02 |
| WO | WO 2012/160560 A1 | 11/2012 | | |

\* cited by examiner

ELECTRONIC LOCATION INFORMATION TO MOBILE DEVICE

FIELD OF THE INVENTION

The present invention relates to a method for getting location information to a mobile device as defined in the preamble of claim 1 and a system for getting location information to a mobile device as defined in the preamble of claim 6.

BACKGROUND OF THE INVENTION

Typical method today to get to know the position or location of the mobile device is to try to locate the mobile device using either GPS or telecommunication network or other means which are mainly based on the idea that the location of the mobile device is detected from outside.

The innovation presented here is based on the opposite idea. The main idea is not to try to locate the mobile device from outside, but on the contrary, the location will tell its location in a certain way to the mobile device close to the location. The mobile device has also some intelligence to make the needed analysis to analyze and deduce the actual location of the mobile device. The deduced location information can be provided also to the other applications in the mobile device.

The location information can be used in the mobile device for different applications—like maps, just to mention one area as an example—geographical maps, city maps, building indoor maps or similar. The location information got using the method described in this innovation can also be communicated to other applications in the mobile device or wirelessly to other service providers who then are able to offer their location based services to the mobile device if the user has authorized them to do so.

A prior-art system providing electronic services is described in patent specification FI 115369 B. In this patent specification is described a method to provide electronic services to a mobile device, including also the global position information, to the mobile device. The mobile device can get the said global position information using short distance communication.

The method described in the patent specification has anyhow many problems. Main problem is when using the Bluetooth system it is difficult to know the actual location if there are several devices at the range of the mobile device having different location information. Also the pairing process can be complicated and takes time.

One mobile device location detection system according to prior art is presented in an international patent publication No. WO2012160560(A1). The publication shows a computerized method of identifying a location of mobile devices. The method comprises providing to a mobile device a mapping dataset which defines a plurality of physical locations of a plurality of beacon devices, receiving at the mobile device at least one distinct signal transmitted from at least one beacon device, extracting from each distinct signal an identifier of a beacon device, matching between the identifier and one of the physical locations using the mapping dataset, and identifying a location of the mobile device according to the matching.

A disadvantage of the solution of WO2012160560(A1) is that the mobile device needs for every location a location specific mapping dataset that has to be prepared location specifically and somehow to be transferred to the mobile device.

The installation of the mapping dataset to the mobile device is very complicated since the mobile device and a server have to communicate with each other in order to enable the transfer of the mapping dataset. If the user has not installed a map of a specific location in advance the mobile location method does not work at that location. In addition this solution needs a lot of updating of the mapping datasets because changes take place all the time.

There are also massive number of innovations which try to detect the location of the mobile device indoors. These prior-art systems detecting the location indoors are anyhow very complicated and the implementation needs a lot of development and co-operation from many stake holders, like operators, IC manufacturers and mobile device manufacturers, and therefore it will take a lot time to develop the services and the development is also very slow.

The presented invention solves the problems and disadvantages mentioned above.

OBJECT OF THE INVENTION

The object of the invention is to provide a simple, economical and fast way to implement the method and the system to locate a mobile device in a certain location indoors or outdoors to provide the location specific services to the user of the mobile device if she or he wants them.

The method and system or shorter the solution according to the invention have several advantages. One advantage is that the method and system according to the invention are operator independent as well all the hardware and software technology elements needed are readily available. Another advantage is that the detection and analysis can happen continuously in real time as the mobile device is moving and nodes are detected or disappear from the proximity of the mobile device. A further advantage is flexibility, so the user can easily set the mobile device and application to detect the location automatically and continuously or as needed. Still further advantage is that the solution according to the invention is very cost competitive, simple, easy and fast to implement and can be used in all kinds of buildings or structures inside or outside. The solution needs only one time installation of the application to the mobile device, and one standard application works in all locations without any location specific actions needed from user or operator, and there is no need to have any mapping datasets to be transferred to the mobile device. Location information is an essential part of the identification of the node and this enables to get the location information directly from the ID. This means also that a minimum maintenance is needed. Still a further advantage is that the method and system is very robust since the effect of one node being out of service would be minimum. And one more advantage is the fact that the method can also be integrated to be a part of e.g. automated systems like warehouse systems or other systems transporting material or people.

BRIEF DESCRIPTION OF THE DRAWINGS

In the following, the invention will be described in detail by the aid of examples by referring to the attached simplified and schematic drawings, wherein.

DETAILED DESCRIPTION OF THE INVENTION

Figure 1:
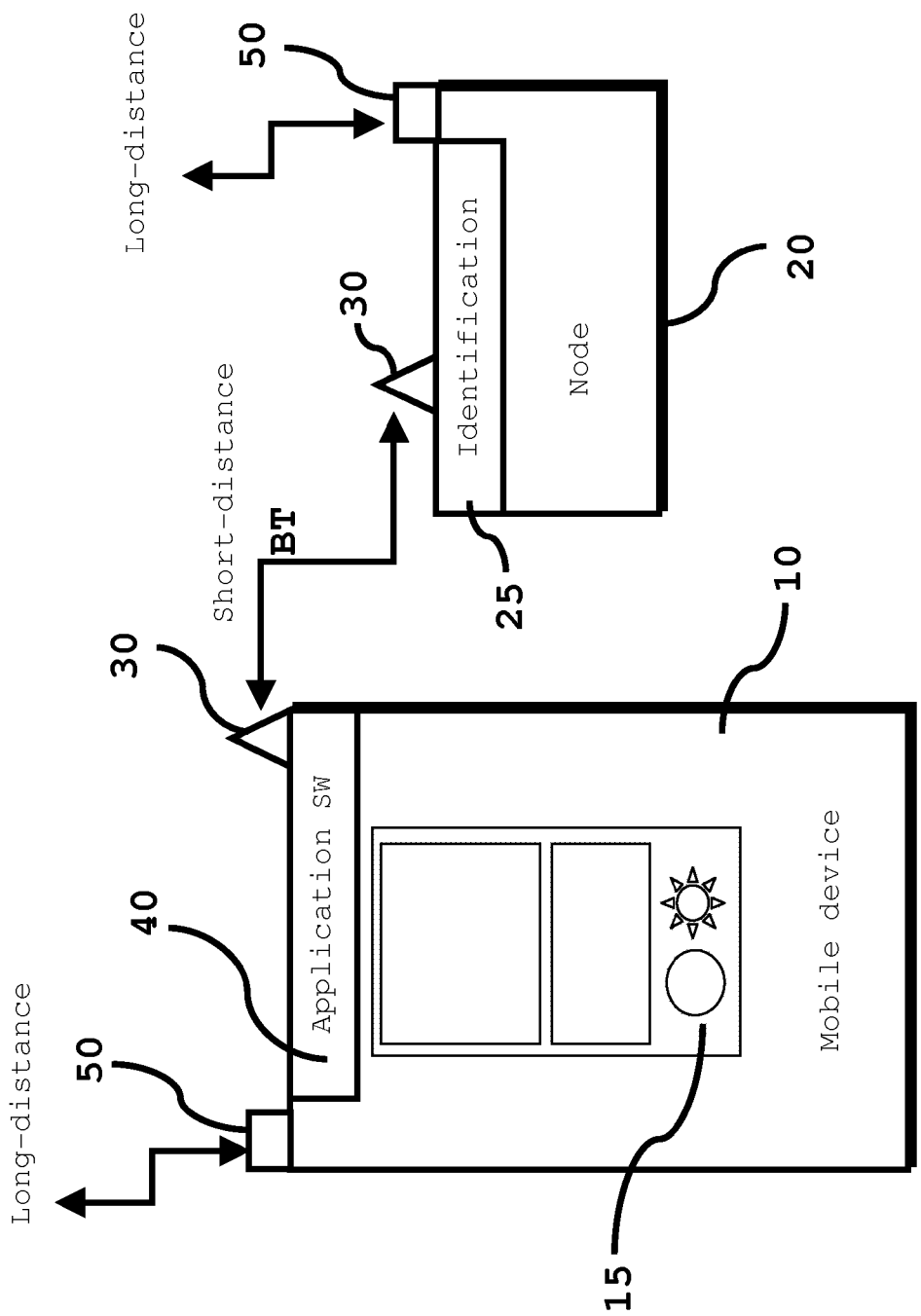
FIG. 1 shows the system configuration in a simplified and diagrammatic way.
Figure 2:
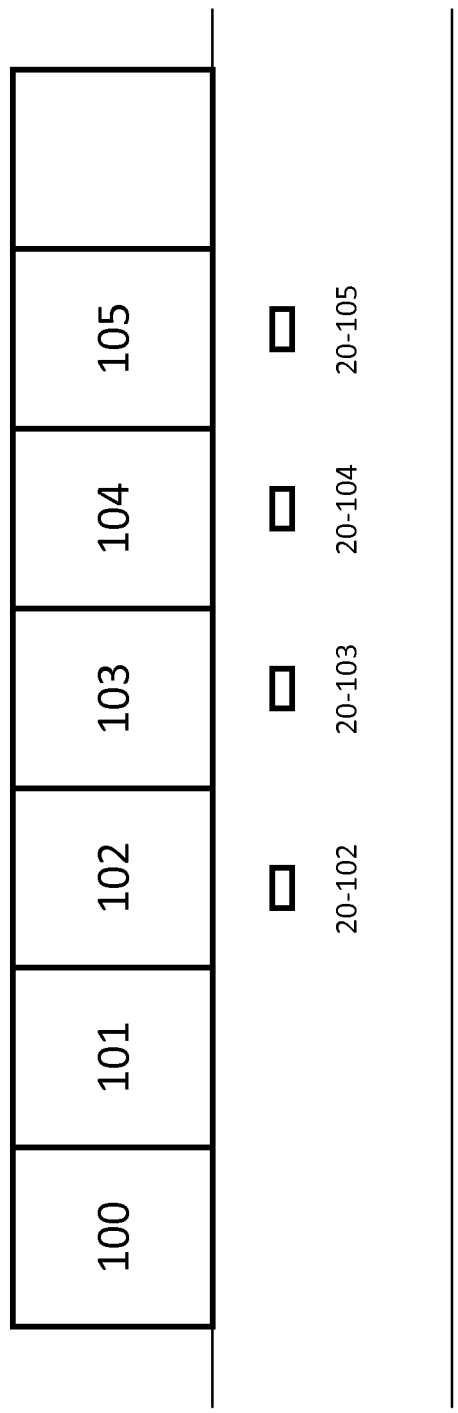
FIG. 2 shows an example of one of the many possible application areas in a simplified and diagrammatic way.

FIG. 1 shows the system configuration and FIG. 2 shows an example of one of the many possible application areas. In FIG. 1 a mobile device 10 having an application 40 and means to communicate with short distance 30 or long distance 50 wireless communication method is communicating with the node 20 using short distance communication—typical example is the Bluetooth technology (BT). Short distance is typically from 0-200 meters and long distance over 200 meters.

The mobile device 10 also has the user interface 15 means to communicate with the user using touch of a part of a body, voice, visual, smell or even some electronic or bioelectronics system integrated temporarily or permanently into the body of the user to act as an interface to material world or communication between other bodies.

The movable or permanently installed node 20 has typically, as a minimum, the means to communicate using the short distance communication 30. Long distance 50 communication capability is a benefit which enables typically more flexible update of the information in the node. The node 20 typically advertises itself for the detection purposes. The node 20 has a unique detectable identifier 25, name or ID, which the mobile device 10 can scan and detect without any special actions. The ID 25 includes, as a minimum, two same or different location data coded directly into its data fields. The information in ID 25 can be in fixed fields or as parameter values.

The location datum is typically global position code specific to the location including the height information.

The location data can also be higher concept location datum, or a piece of information, like a floor level code in a building, a room code in a building or corridor, an area section at the stadium or parking hall, a seat row in a theater or even a building address just to mention some examples.

The ID 25 also has a special method specific code with which it is possible to know by the application 40 in the mobile device 10 selecting the nodes that the node is a valid node and the location data in the node ID fulfill the pre-set requirements. The said code would include also the information of the communication distance capability of the node. Part or all of the ID 25 data can be encrypted.

So the ID 25 can at the same time include different types of location specific high level concept pieces of information like, country, state, city, name of the building, floor id, room id, area id, corridor id, name of the place, type of the place, name of the company, street address, postcode, phone number, URL, internet address, shelf number, id of the object etc. Therefore, if the short distance communication is activated in the mobile device 10, comprehensive location related information is available to the mobile device 10 at the proximity of the node 20 without any special actions needed from the user or the mobile device 10.

The proximity distance depends on the communication capability of the short distance communication technology used as well as on the possible limitations coming from the physical structures or any possible disturbances at the location itself where the nodes 20 are installed. The accuracy of the location information got to the mobile device 10 depends on the available proximity distance, number and placement of the nodes 20 used as well as of the number or amount of the pieces of the location information, or data, available in the identification. Typically only the most accurate piece of the location information in the ID 25 has multiple datum, two or more pieces. The same short-distance communication technology can have different proximity—communication distance capability—versions and it is important also to be able to separate the versions from each other. The communication capability information of the node 20 can also be in the ID 25.

To be able to know the location of the mobile device 10 inside the building in different places the method includes that several nodes 20, having two or more global or high level concept location datum coded into their IDs 25, are placed in a certain way in the area outdoors or inside the building.

The way the nodes 20 are placed depends on the space, the short distance communication technology used and the accuracy wanted. Inside the building the technology used would be typically Bluetooth with about 10 meter short distance communication capability. If shorter communication distance is required the communication distance can be weakened.

An essential part of the method and system is the application software 40 in the mobile device 10. The application 40 can detect, analyze and deduce the location of the mobile device 10 based on the available information in the identification of the node 20 or nodes and the available pieces of the location information in them as well taking into account the strength of the field of detected nodes.

The following Table 1 will summarize the main process to get the location information from the node 20 or nodes to the mobile device 10.

TABLE 1

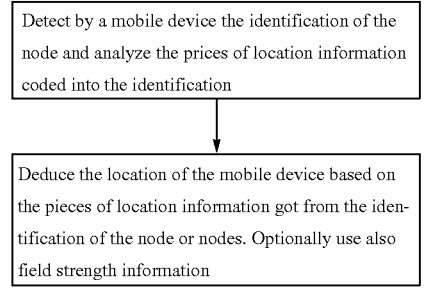

| Detect by a mobile device the identification of the node and analyze the prices of location information coded into the identification |
| --- |
| Deduce the location of the mobile device based on the pieces of location information got from the identification of the node or nodes. Optionally use also field strength information |

DETAILED DESCRIPTION OF THE INVENTION

FIG. 2 shows a corridor having several about seven meters wide rooms in a building which could be a shopping center or car park or office building or hospital or hotel or airport or a similar structure. To get about 10 meters continuous accuracy, which is normally accurate enough inside buildings, the Bluetooth technology based the nodes 20 capable to communicate within 10 meters distance can be placed so that the distance between the nodes 20 is little bit less than 10 meters. In this kind of a case the mobile device 10 will see at least two nodes 20 simultaneously.

In this example the nodes 20 have at a minimum three different pieces of "room number" location information coded into their ID 25 in addition to possible other pieces of high level concept location information or global position codes. First in the order is the location of the previous node 20, then the actual location of the said node 20 and then as third is the location of the next node 20. As a simple example, lets mark the rooms as room 100, 101, 102, 103, 104, 105 etc.

Then the node 20-102 placed in front of the room 102 will have high level concept pieces of location information 101, 102, 103; the node 20-103 placed in front of the room 103 will have high level concept pieces of location information 102, 103, 104; and the node 20-104 placed in front of the room 104 will have high level concept pieces of location information 103, 104, 105.

Now the mobile device 10 located at the proximity of the node 20-103 can detect either only node 20-103 or nodes 20-103, 20-102 and even 20-104. Depending on the number of the detected nodes, and the available location data in the ID 25 of the nodes, the application 40 in the mobile device 10 can deduce the closest node without any further need to communicate with the nodes and therefore can decide the location of the mobile device 10 very fast and accurately.

In this simple example the application in the mobile device 10 would decide the location in the following way:

In case the mobile device 10 can detect only the node 20-103 then the location would be the middle location datum in the node 20-103.

In case the mobile device 10 can detect two separate nodes the application 40 would analyze the sequence of the pieces of the location information and select the middle one of the information in the node which matches one of the lowest or highest piece of location information in the another detected node.

In case three separate nodes are detected the application 40 would select the piece of location information which could be available in all IDs 25 of the nodes.

The previous corridor example is also almost identical for example to detect automatically the floor level of the building which can then be used for example for guidance applications. In case the floor level as well the room number would be of interest at the same time then the ID 25 would have also the pieces of floor information in it on top of the pieces of the room numbers.

There can also be more nodes 20 placed in the proximity of the mobile device 10. The number of the nodes 20, the number and the sequence of the different pieces of location information coded into the ID 25 are dependant of the accuracy of the location needed and the needs of the services to be provided. In all cases the decision logic, optimally global and generic, to decide the location of the mobile device 10, is inbuilt into the application 40 in the mobile device 10 detecting the nodes 20 and deciding and managing the location.

The detection and analysis can happen continuously in real time as the mobile device 10 is moving and nodes 20 are detected or disappear from the proximity of the mobile device 10.

The optimum system would consist of one or multiple very low cost and simple wirelessly, or by some other means, programmable nodes 20 based on Bluetooth or similar technology. The nodes 20 could be small stand alone, long lasting battery operated or connected to power supply, devices which are very easy to install into the structures for fast system setup. The needed Bluetooth or similar technology and the innovation presented here can also be integrated into the other devices used in buildings, like vending machines, ATM machines, electronic LED lamps, fire detectors, people flow detectors, electronic locks or similar devices which naturally have the power supply available and stay long times in the position they are installed in.

The standard global application 40 to the mobile device 10 can be downloadable to different platforms from the application sites of the different manufacturers or service providers. The application 40 can also be service or solution specific. Typically the user would control the application and decide when he or she wants to get to know the location and possibly activate the services available based on that location. So the user could set the mobile device 10 and application 40 to detect the location automatically and continuously or as needed.

It is clear to the expert that the method and system according to the invention is very cost competitive, simple, easy and fast to implement and can be used in all kinds of buildings or structures inside or outside to know the position of the mobile device 10 with reasonable accuracy for most of the everyday needs.

This method and system is also very robust since the effect of one node 20 being out of service would be minimum. In critical cases two or more nodes 20 with the same location information can be used without any changes to the application logic.

This method can also be integrated to be part of e.g. automated systems like warehouse systems or other systems transporting material or people. For example bus stops or taxi stands could have the location information available to the mobile device 10 to be utilized when requesting the transportation service.

It is obvious to the person skilled in the art that the invention is not restricted to the example and embodiments described above but that it may be varied within the scope of the claims presented below.

The invention claimed is:

1. A method for providing location information to a mobile device which location information provides the user an indication of mobile device position without requiring use of mapping software or a mapping data set, which is activated to communicate using a short distance communication network communicating between a plurality of nodes having location information associated therewith and comprising:

supplying three or more nodes for use with the communication network with identifications describing the locations of the node as location information;

supplying the mobile device with the identifications of at least three nodes including a present node from which the mobile device is receiving communication, a first adjacent node adjacent the present node from which the mobile device may have previously received communication and a second adjacent node adjacent the present node that will likely next communicate with the mobile device;

wherein the communication includes the node location information;

decoding by the mobile device the identification information of the node in relative proximity to the mobile device; and selecting and analyzing pieces of location information in the identification of the detected and selected nodes relevant to mobile device location using an the application in the mobile device;

deducing the location of the mobile device using the application in the mobile device based on the analyzed location information received from the identification of a node without requiring the use of mapping software of a mapping data set, wherein said step of deducing includes detecting by the mobile device the identification of the node or nodes detected to be in proximity to the mobile device;

identifying nodes having close proximity to the present node and first and second adjacent nodes and providing the locations thereof using the application in the mobile device; and deducing the location of the mobile device using the application in the mobile device to decide the location of the mobile device based on the analyzed pieces of location information without requiring use of mapping software or a mapping data set.

2. The method according to claim 1, wherein a location to place three or more nodes, an amount of the pieces of location information included in the identification and a short-distance communication capability are defined taking into account a desired accuracy.

3. The method according to claim 2, wherein the pieces of location information included in the identification further include two or three dimensional global position information or different types of high level concept location information or both.

4. The method according to claim 3, wherein the high level concept location information is selected from a group consisting of country, state, city, floor id, room id, area id, corridor id, name of the place, name of the building, type of the place, name of the company, street address, postcode, phone number, URL, internet address, shelf number, and id of the object.

5. The method according to claim 2, wherein the mobile device detects and selects the identifications of the nodes and analyses the pieces of location information automatically and continuously or as requested by the user.

6. The method according to claim 2, wherein the application may be downloaded and installed from a public sites providing the service and operation is activated or de-activated by the user of the mobile device as desired.

7. The method according to claim 1, wherein the pieces of location information included in the identification further include two or three dimensional global position information or different types of high level concept location information or both.

8. The method according to claim 7, wherein the high level concept location information is selected from a group consisting of country, state, city, floor id, room id, area id, corridor id, name of the place, name of the building, type of the place, name of the company, street address, postcode, phone number, URL, internet address, shelf number, and id of the object.

9. The method according to claim 8, wherein the mobile device detects and selects the identifications of the nodes and analyses the pieces of location information automatically and continuously or as requested by the user.

10. The method according to claim 8, wherein the application may be downloaded and installed from a public site providing the service and operation is activated or de-activated by the user of the mobile device as desired.

11. The method according to claim 7, wherein the mobile device detects and selects the identifications of the nodes and analyses the pieces of location information automatically and continuously or as requested by the user.

12. The method according to claim 7, wherein the application may be downloaded and installed from a public site providing the service and operation is activated or de-activated by the user of the mobile device as desired.

13. The method according to claim 1, wherein the mobile device detects and selects the identifications of the nodes and analyses the pieces of location information automatically and continuously or as requested by the user.

14. The method according to claim 13, wherein the application may be downloaded and installed from a public site providing the service and operation is activated or de-activated by the user of the mobile device as desired.

15. The method according to claim 1, wherein the application may be downloaded and installed from a public sites providing the service and operation is activated or de-activated by the user of the mobile device as desired.

16. A system for providing location information to a mobile device utilizing a short distance communication network communicating between plural nodes, the system providing the user of the mobile device an indication of the mobile device position without requiring use of mapping software or a mapping data set, the mobile device detecting the identification of a node or nodes having location information associated therewith, the mobile device including an application used to deduce the location without requiring the use of mapping software of a mapping data set, the system comprising:

three or more nodes each having an identification and including a method specific code identifying node location with location information an application processor provided in the mobile device to analyze and deduce location of the mobile device using inbuilt decision logic to decide the location of the mobile device based on location information obtained from a node in proximity to the path of the mobile device including location information of a node currently in closest detected proximity to the mobile device as well as the location information of a first adjacent node and a second adjacent node, each adjacent the node currently in closest proximity to the path of the mobile device.

17. The system according to claim 16, wherein the mobile device is arranged to communicate using short distance communication and may communicate with user using touch of a part of a body, voice, visual, smell or some electronic or bioelectronics system integrated temporarily or permanently into the body of the user to act as an interface.

18. The system according to claim 16, wherein the nodes are arranged to communicate using a short distance communication and part or all the nodes identification data can be encrypted and possible to modify.

19. The system according to claim 16, wherein the identification includes a method specific code including the information of the communication distance capability of the node.

* * * * *